(12) United States Patent
Tanno et al.

(10) Patent No.: US 8,506,276 B2
(45) Date of Patent: Aug. 13, 2013

(54) METHOD FOR MANUFACTURING BLADDER FOR USE IN MANUFACTURING TIRES

(75) Inventors: Atsushi Tanno, Hiratsuka (JP); Yuji Sato, Hiratsuka (JP); Makoto Ashiura, Hiratsuka (JP); Yoshio Hirose, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 156 days.

(21) Appl. No.: 13/091,351

(22) Filed: Apr. 21, 2011

(65) Prior Publication Data

US 2011/0262573 A1    Oct. 27, 2011

(30) Foreign Application Priority Data

Apr. 23, 2010  (JP) ................................ 2010-099552

(51) Int. Cl.
*B29C 33/40*     (2006.01)
(52) U.S. Cl.
USPC .............. 425/52; 156/123; 156/242; 525/100
(58) Field of Classification Search
USPC ................ 425/52; 156/123, 242, 278, 307.1; 525/100; 264/315
See application file for complete search history.

(56) References Cited

U.S. PATENT DOCUMENTS

| | | | | |
|---|---|---|---|---|
| 4,814,214 A | * | 3/1989 | Tomita et al. | 264/315 |
| 4,863,650 A | * | 9/1989 | Kohler et al. | 264/315 |
| 4,889,677 A | * | 12/1989 | Hashimoto et al. | 264/315 |
| 5,152,950 A | * | 10/1992 | Ona et al. | 264/315 |
| 5,593,701 A | * | 1/1997 | Graves et al. | 425/52 |
| 7,896,633 B2 | * | 3/2011 | Agostini et al. | 425/52 |
| 8,323,014 B2 | * | 12/2012 | Lo Presti et al. | 425/52 |
| 2011/0086981 A1 | * | 4/2011 | Ashiura et al. | 525/105 |

FOREIGN PATENT DOCUMENTS

JP            06-339927        12/1994

* cited by examiner

*Primary Examiner* — James Mackey
(74) *Attorney, Agent, or Firm* — Thorpe North & Western LLP

(57) ABSTRACT

A method for manufacturing a bladder for use in manufacturing tires having a surface-modified rubber layer on an outer surface side of a base rubber layer, including the steps of: forming an uncross-linked body of the surface-modified rubber layer by molding a rubber composition including a modified butyl rubber composition and an organic peroxide and applying a siloxane compound having a (meth)acryloyl group to a surface of this rubber molded body; forming the base rubber layer from an unvulcanized body or vulcanized body formed from a rubber composition different than the modified butyl rubber composition; laminating the uncross-linked body of the surface-modified rubber layer on the outer surface side of the base rubber layer; and heat treating.

20 Claims, 1 Drawing Sheet

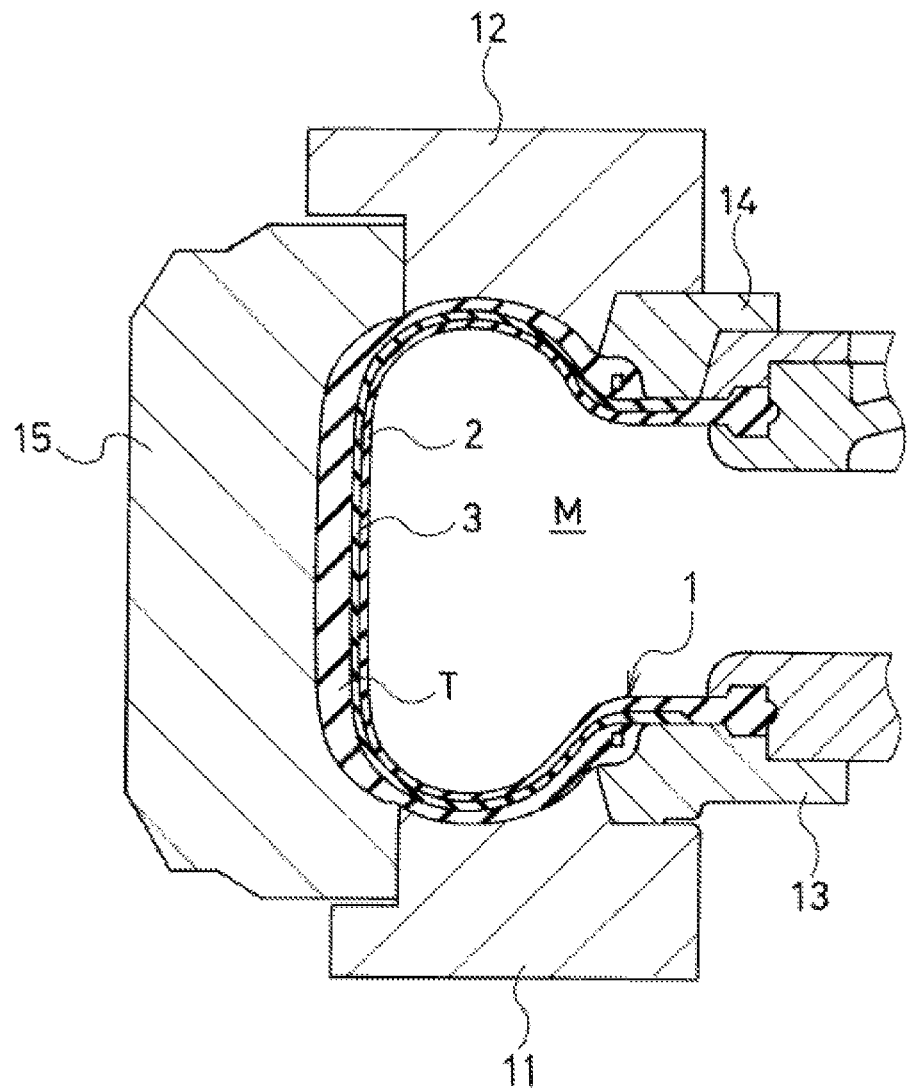

METHOD FOR MANUFACTURING BLADDER FOR USE IN MANUFACTURING TIRES

PRIORITY CLAIM

Priority is claimed to Japan Patent Application Serial No. 2010-099552 filed on 23 Apr. 2010.

BACKGROUND

1. Technical Field

The present technology relates to a method for manufacturing a bladder for use in manufacturing tires, and more particularly relates to a method for manufacturing a bladder for use in manufacturing tires configured so as to have superior release performance between a tire and a bladder when the tire is manufactured, and enhanced sustainability thereof.

2. Related Art

Generally, vulcanization molding of pneumatic tires is performed by vulcanizing while pressing an outer surface of an unvulcanized tire against an inner surface of a vulcanizing mold. The unvulcanized tire is placed in the vulcanizing mold, a heating/pressurizing medium such as steam or the like is pressure injected into a rubber pouch-shaped bladder inserted into a cavity of the unvulcanized tire, and the unvulcanized tire is expanded. The bladder is generally formed from a butyl rubber, and therefore there is vulcanization adhesion between the bladder and an inner liner made from halogenated butyl rubber, or the like, disposed on an inner circumferential surface of the unvulcanized tire. Therefore, releaseability is inferior when the bladder is shrunk and removed from the pneumatic tire after vulcanization. There are thus problems with damage and the like to the inner liner of the tire inner circumferential surface.

To solve these problems, measures have been implemented such as applying release agents made from various types of silicone and the like to an outer surface of the bladder or the inner circumferential surface of the unvulcanized tire, or forming a layer of a release agent by applying a release agent to the outer surface of the bladder and then curing said release agent. However, the release agent must be applied at each vulcanization molding because a release effect of the release agent is not sustained for a long period of time by simply applying the release agent. Therefore, the effects on workability and the working environment are problems. Additionally, when forming a layer of a release agent by applying a release agent made from various types of silicone, or the like, to the outer surface of the bladder and curing, while there is a slight increase in release performance, the layer of the release agent cracks and peels as a result of repeated expansion and contraction of the bladder at vulcanization molding. Therefore, it has not been possible to sufficiently sustain release performance.

For this reason, Japanese Patent No. 3316034 proposes forming a lubrication layer with release properties made from two layers, a silicone rubber layer and a silicone resin layer, on the outer surface of the bladder. However, with this method, because the outer surface of the resin cross-linked bladder is surface-treated, the reactivity of the silicone rubber with butyl rubber molecules is low, and the silicone rubber layer peels due to repeated expansion and contraction of the bladder at vulcanization molding. Therefore, insufficient sustainability of the release effect has been a problem.

SUMMARY

The present technology provides a method for manufacturing a bladder for use in manufacturing tires configured so as to have superior release performance between a tire and a bladder when the tire is manufactured and enhanced sustainability thereof. In order to achieve the technology, the method for manufacturing a bladder for use in manufacturing tires having a surface-modified rubber layer on an outer surface side of a base rubber layer includes the steps of: forming an uncross-linked body of the surface-modified rubber layer by molding a rubber composition including a modified butyl rubber composition (A) or (B) and an organic peroxide and applying a siloxane compound having a (meth)acryloyl group to a surface of this rubber molded body; wherein the modified butyl rubber composition (A) includes a modified butyl rubber (1) formed by reacting, with butyl rubber, a compound (a) having a nitroxide free radical in the molecule that is stable at ambient temperature in the presence of oxygen, a radical initiator (b), and a radical polymeric monomer (c) having at least difunctionality; and the Modified butyl rubber composition (B) is formed by compounding the monomer (c) with a modified butyl rubber (2) formed by reacting the compound (a) and the radical initiator (b) with butyl rubber; forming the base rubber layer from an unvulcanized body or vulcanized body formed from a rubber composition different than the modified butyl rubber compositions (A) and (B); laminating the uncross-linked body of the surface-modified rubber layer on the outer surface side of the base rubber layer; and heat treating.

The siloxane compound having a (meth)acryloyl group is preferably at least one selected from organopolysiloxane compounds expressed by the following formulas (1), (2), or (3):

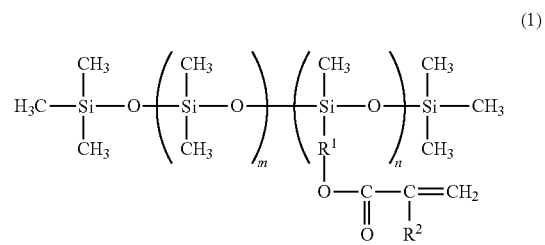

(1)

(wherein $R^1$ is a polyalkylene glycol or alkyl group, $R^2$ is hydrogen or a methyl group; and m and n are integers selected such that a number average molecular weight is from 1,000 to 20,000, and a ratio m:n satisfies 98:2 to 90:10);

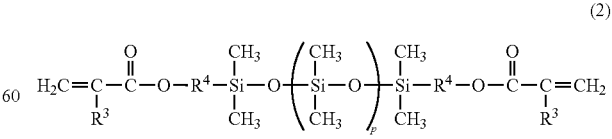

(2)

(wherein $R^3$ is a hydrogen or a methyl group; $R^4$ is an alkyl group or an alkylene group; and p is an integer selected such that a number average molecular weight is from 100 to 20,000);

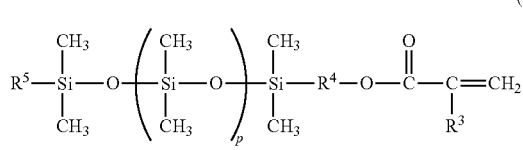

(3)

(wherein $R^3$ is hydrogen or a methyl group, $R^4$ and $R^5$ independently are alkyl groups or alkylene groups, and p is an integer selected such that a number average molecular weight is from 100 to 20,000).

The radical polymeric monomer (c) having at least difunctionality can be simultaneously added to or reacted with a radical polymeric monomer (d) having an alkoxysilyl group.

A base bladder formed by vulcanization molding a butyl rubber composition can be used as the base rubber layer. Additionally, after laminating the uncross-linked body of the surface-modified rubber layer on the outer surface side of the base bladder, this laminate is preferably heat treated in a mold.

The bladder for use in manufacturing tires obtained through the manufacturing method of the present technology has superior release performance between a vulcanized pneumatic tire and the bladder, and this releaseability can be sustained for an extended period of time.

With the method for manufacturing a bladder for use in manufacturing tires of the present technology, the uncross-linked body of the surface-modified rubber layer is formed by molding a rubber molded body from a rubber composition including the modified butyl rubber composition (A) or (B) described above and the organic peroxide; then applying the siloxane compound having a (meth)acryloyl group on a surface thereof. Because this uncross-linked body of the surface-modified rubber layer is laminated on an outer surface side of a base rubber layer formed by an unvulcanized body or vulcanized body made from a rubber composition different than the modified butyl rubber compositions (A) and (B) and heat treated, a surface-modified rubber layer having superior releaseability is formed on the outer surface side of the base rubber layer. With this surface-modified rubber layer, when the uncross-linked rubber molded body formed from the modified butyl rubber composition (A) or (B) is organic peroxide cross-linked, the siloxane compound having a (meth) acryloyl group reacts with the modified butyl rubber composition, resulting in the siloxane compound having a (meth) acryloyl group being firmly bonded to the surface of the rubber layer molded body, imparting excellent releaseability, and greatly enhancing sustainability of that releaseability. Additionally, because the rubber molded body formed from the modified butyl rubber composition (A) or (B) and the base rubber layer are firmly cross-linked/adhered through the heat treating, peeling of the surface-modified rubber layer from the base rubber layer due to repeated expansion and contraction of the bladder at the time of vulcanization molding will not occur, and a bladder having superior durability can be obtained.

BRIEF DESCRIPTION OF THE DRAWING

FIG. 1 is a cross-sectional view illustrating a state of an unvulcanized tire being vulcanized using an example of a bladder for use in manufacturing tires fabricated according to the present technology.

DETAILED DESCRIPTION

In FIG. 1, an unvulcanized tire T is inserted into a vulcanizing mold (11 to 15) and a rubber pouch-shaped bladder 1 for use in manufacturing tires is inserted into a cavity of the unvulcanized tire T. Vulcanization is performed by pressing an outer surface of the unvulcanized tire T against an inner surface of the vulcanizing mold (11 to 15) by expanding the bladder 1 by pressure injecting a heating/pressurizing medium M such as steam or the like into the bladder 1 for use in manufacturing tires. The vulcanizing mold is provided with a bottom side wall 11 and a top side wall 12 for molding a side wall portion of the tire, a bottom bead ring 13 and a top bead ring 14 for molding a bead portion of the tire, and a plurality of sectors 15 for molding a tread portion of the tire.

The bladder 1 for use in manufacturing tires fabricated according to the present technology is formed by laminating a surface-modified rubber layer 3 on an outer surface side of a base rubber layer 2. The surface-modified rubber layer 3 has a layer on an outermost layer thereof that is formed from a siloxane compound having a (meth)acryloyl group. Therefore, releaseability from an inner liner formed from halogenated butyl rubber or the like that is disposed on an inner circumferential surface of the pneumatic tire is superior. Additionally, the siloxane compound having a (meth)acryloyl group is solidly chemically bonded to the outer surface of the surface-modified rubber layer 3. Therefore, cracking and peeling due to repeated expansion and contraction of the bladder will not occur and superior release performance can be sustained for an extended period of time.

The base rubber layer 2 is formed by a rubber composition. The rubber composition is a rubber composition that is different than the modified butyl rubber compositions (A) and (B) that form the surface-modified rubber layer 3. Manufacturing costs of the bladder for use in manufacturing tires can be reduced by forming the base rubber layer 2 from a rubber composition that is different from the modified butyl rubber compositions (A) and (B). Examples of the rubber composition used to form the base rubber layer 2 include rubber compositions including at least one rubber component selected from butyl rubber, halogenated butyl rubber, ethylene propylene rubber, isoprene rubber, isobutylene rubber, polybutene rubber, chloroprene rubber, various styrene-butadiene copolymers, styrene-isoprene-butadiene copolymers, various butadiene rubbers, acrylonitrile-butadiene copolymers, and the like. Of these, a butyl rubber composition having butyl rubber and/or halogenated butyl rubber as a main component is preferable due to superior impermeability to the heating/pressurizing medium.

Additionally, the rubber composition that forms the base rubber layer 2 can also contain various additives that are generally added to rubber compositions for use in bladders such as carbon black; other reinforcing agents/fillers such as silica, talc, and clay; vulcanizing or cross-linking agents, vulcanizing or cross-linking accelerators, various oils, anti-aging agents, plasticizers, and the like. These additives can be kneaded in by any commonly known method to form a composition, which can be used for vulcanizing or cross-linking.

Compounded amounts of these additives may be any conventional amount, so long as the object of the present technology is not hindered.

As a composition of the rubber composition that forms the base rubber layer 2, preferably from 30 to 80 parts by weight and more preferably from 40 to 70 parts by weight of carbon black are compounded per 100 parts by weight of the rubber component. Satisfactory balance between thermal conductivity and durability is achieved by compounding carbon black at such a composition. It is not preferable that the compounded amount of the carbon black be too great because if so durability will be negatively affected. Likewise, it is not preferable that the compounded amount of the carbon black be too low because if so thermal conductivity will decline. Various compounding agents and fillers generally used in bladders for use in manufacturing tires can be added.

The unvulcanized body or vulcanized body of the rubber composition described above can be used as the base rubber layer 2 for use in the manufacturing method of the present technology. When using an unvulcanized body of the rubber composition as the base rubber layer 2, the base rubber layer 2 can be vulcanized and the surface-modified rubber layer 3 can be cross-linked simultaneously by laminating and heat treating the uncross-linked body of the surface-modified rubber layer 3. Additionally, when using a vulcanized body of the rubber composition as the base rubber layer 2, a vulcanized body obtained by green molding an unvulcanized body (rubber sheet) formed from the rubber composition that forms the base rubber layer 2 and vulcanizing this unvulcanized body in advance (referred to also as "base bladder" hereafter) can be used. By using a base bladder that is vulcanization molded as described above, the gauge of the base rubber layer 2 can be made uniform. Thereby, when injecting the heating/pressurizing medium it is possible to expand the base bladder uniformly and also enhance the durability of the bladder for use in tire manufacturing. The base bladder is preferably vulcanization molded from a butyl rubber composition, but may also be a conventional bladder for use in tire vulcanization.

In the present technology, after the uncross-linked body of the surface-modified rubber layer 3 is laminated on the outer surface side of the base bladder (base rubber layer 2) that is vulcanization molded from the butyl rubber composition, this laminate is preferably heat treated in a mold. The methods of laminating and heat treating the base rubber layer 2 and the surface-modified rubber layer 3 are not particularly limited and any desired method can be used. For example, a vulcanization or heat treating method can be used in which the uncross-linked body of the surface-modified rubber layer 3 on which the siloxane compound has been applied is disposed on an outer side of the unvulcanized body or vulcanized body forming the base rubber layer 2 so that the siloxane compound is on the outer side. Here, a conventional mold for use in bladder vulcanization is used, and heat treating may be performed from the inside and/or the outside.

Additionally, as another method, a process in which a conventional tire vulcanizing mold and a base bladder that will become the base rubber layer 2 can be used to vulcanization mold the unvulcanized tire. In this method, first, when green molding the unvulcanized tire, the uncross-linked body of the surface-modified rubber layer 3 on which the siloxane compound has been applied is wrapped on a tire molding drum beforehand. Then, the inner liner, carcass layer, and the like are wrapped on an outer side thereof, and thus, the unvulcanized tire is green molded. The unvulcanized tire molded as described above has the uncross-linked body of the surface-modified rubber layer 3 on an inner circumferential surface of the inner liner. Using the base bladder that forms the base rubber layer 2, this unvulcanized tire is vulcanization molded in a conventional mold for vulcanizing tires. Because the surface-modified rubber layer 3 is affixed to the outer surface side of the base bladder through the heat treating at this point, a bladder 1 for use in tire manufacturing is obtained wherein the base rubber layer 2 and the surface-modified rubber layer 3 are cross-linked and adhered. Note that the inner circumferential surface of the inner liner and the outer surface of the surface-modified rubber layer 3 of the vulcanized tire are easily separated due to the siloxane compound being interposed therebetween.

In the manufacturing method of the present technology, both modified butyl rubber compositions (A) and (B) that form the uncross-linked body of the surface-modified rubber layer 3 can be cross-linked by an organic peroxide. Therefore, when an uncross-linked rubber molded body formed from the modified butyl rubber composition (A) or (B) is cross-linked by a peroxide, the siloxane compound having a (meth)acryloyl group applied to a surface thereof beforehand reacts with the modified butyl rubber, allowing for surface modification of the surface-modified rubber layer 3.

Generally, a bladder for use in tire manufacturing that is attached to a vulcanization molder for a pneumatic tire is formed by resin cross-linking butyl rubber. Therefore, even if resin cross-linking is performed after applying the siloxane compound on a surface of the uncross-linked rubber molded body formed from the butyl rubber beforehand, the siloxane compound will not react with the butyl rubber molecules. Therefore, there is little difference in release performance compared to a case where the siloxane compound is applied to a cross-linked rubber molded body.

With the present technology, peroxide cross-linking of the uncross-linked modified butyl rubber molded body and reacting with the siloxane compound having a (meth)acryloyl group are performed simultaneously. The siloxane compound is thus firmly bonded to the surface of the surface-modified rubber layer 3, imparting it with excellent releaseability, and greatly enhancing sustainability of that releaseability.

The modified butyl rubber composition (A) is made from a modified butyl rubber (1) that is formed by reacting a compound (a) having a nitroxide free radical in a molecule that is stable at ambient temperature in the presence of oxygen (hereinafter referred to as "compound (a)"), a radical initiator (b), and a radical polymeric monomer (c) having at least difunctionality (hereinafter referred to also as "monomer (c)" with butyl rubber. While the manufacturing method of the modified butyl rubber (1) is not particularly limited, methods such as the following are preferable. First, a modified butyl rubber (2), in which the compound (a) is grafted to butyl rubber, is obtained by reacting the compound (a) and the radical initiator (b) with butyl rubber. A peroxide crosslinkable modified butyl rubber (1) is obtained by reacting the monomer (c) with the modified butyl rubber (2).

Furthermore, the modified butyl rubber composition (B) is made from a composition in which the monomer (c) is compounded with the modified butyl rubber (2), which is made by reacting the compound (a) and the radical initiator (b) with butyl rubber. With the modified butyl rubber composition (B), when the unvulcanized rubber molded body formed using a rubber composition including the modified butyl rubber (2) and the monomer (c) is heat-treated, a reaction between the modified butyl rubber (2) and the monomer (c) occurs simultaneously with the peroxide cross-linking.

Examples of the compound (a) having a nitroxide free radical in the molecule that is stable at ambient temperature in the presence of oxygen used in the present technology include 2,2,6,6-tetramethyl-1-piperidinyloxy (hereinafter referred to as "TEMPO") described by the following formula (4); 4-oxo-2,2,6,6-tetramethyl-1-piperidinyloxy described by the following formula (5); and the like. Furthermore, a compound with a substituent at a position 4 of the TEMPO expressed by the following formulas (6) through (11) can also be used as the compound (a).

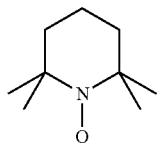
(4)

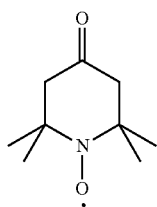
(5)

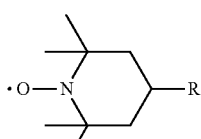
(6)

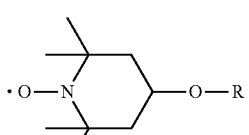
(7)

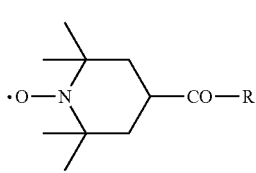
(8)

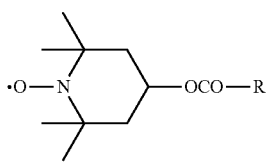
(9)

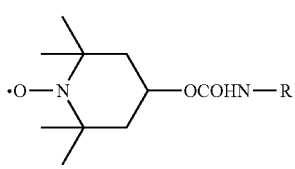
(10)

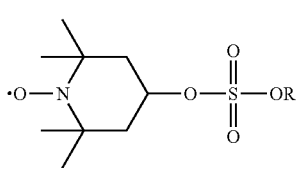
(11)

In formulas (6) through (11), R is a functional group having between 1 and 30 carbon atoms selected from an alkyl group, alkylene group, aryl group, allyl group, vinyl group, carboxyl group, a group containing a carbonyl group, ester group, epoxy group, isocyanate group, hydroxy group, thiol group, thiirane group, amino group, amide group, imide group, nitro group, nitrile group, thiocyan group, silyl group, alkoxysilyl group, or an organic group containing these functional groups.

Herein, examples of groups containing a carbonyl group include residues of cyclic anhydrides such as succinate anhydride, maleic anhydride, glutarate anhydride, phthalate anhydride, and the like. Furthermore, in the formula (6), R may also be a halogen such as chlorine, bromine, or the like.

Examples of the compound (a) expressed by the formula (6) include 4-methyl TEMPO, 4-ethyl TEMPO, 4-phenyl TEMPO, 4-chloro TEMPO, 4-hydroxy TEMPO, 4-amino TEMPO, 4-carboxyl TEMPO, 4-isocyanate TEMPO, and the like. Examples of the compound (a) expressed by the formula (7) include 4-methoxy TEMPO, 4-ethoxy TEMPO, 4-phenoxy TEMPO, 4-TEMPO-glycidyl ether, 4-TEMPO-thioglycidyl ether, and the like.

Examples of the compound (a) expressed by the formula (8) include 4-methylcarbonyl TEMPO, 4-ethylcarbonyl TEMPO, 4-benzoyl TEMPO, and the like. Examples of the compound (a) expressed by the formula (9) include 4-acetoxy TEMPO, 4-ethoxycarbonyl TEMPO, 4-methacrylate TEMPO, 4-benzoyloxy TEMPO, and the like.

Examples of the compound (a) expressed by the formula (10) include 4-(N-methylcarbamoyloxy) TEMPO, 4-(N-ethylcarbamoyloxy) TEMPO, 4-(N-phenylcarbamoyloxy) TEMPO, and the like. Examples of the compound (a) expressed by the formula (11) include methyl (4-TEMPO) sulfate, ethyl (4-TEMPO) sulfate, phenyl (4-TEMPO) sulfate, and the like.

Furthermore, examples of the compound (a) include compounds of 2,2,5,5-tetramethyl-1-pyrrolidinyloxy (hereinafter referred to as "PROXYL") with a substituent at a third position as described in the following formula (12); and compounds of 2,2,5,5-tetramethyl-3-pyrroline-1-oxy (hereinafter referred to as "PRYXYL") with a substituent at a third position as described in the following formula (13).

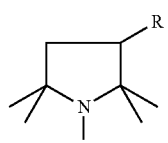
(12)

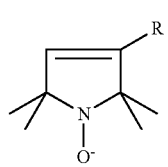
(13)

In the formulas (12) and (13), R is a functional group having between 1 and 30 carbon atoms selected from an alkyl group, aryl group, allyl group, vinyl group, alkoxy group, carboxyl group, a group containing a carbonyl group, ester group, epoxy group, glycidyl group, isocyanate group, hydroxy group, thiol group, thiirane group, thioglycidyl group, amino group, amide group, imide group, carbamoyl group, nitro group, nitrile group, thiocyan group, silyl group, alkoxysilyl group, and organic groups containing these functional groups.

Examples of the compound (a) expressed by the formula (12) include 3-amino-PROXYL, 3-hydroxy-PROXYL, 3-isocyanate-PROXYL, 3-carboxyl-PROXYL, 3-PROXYL-glycidyl ether, 3-PROXYL-thioglycidyl ether, 3-carbamoyl-PROXYL, and the like. Examples of the compound (a) expressed by the formula (13) include 3-amino-PRYXYL, 3-hydroxy-PRYXYL, 3-isocyanate-PRYXYL, 3-carboxyl-PRYXYL, 3-PRYXYL-glycidyl ether, 3-PRYXYL-thioglycidyl ether, 3-carbamoyl-PRYXYL, and the like. Other examples of the compound (a) include the following:

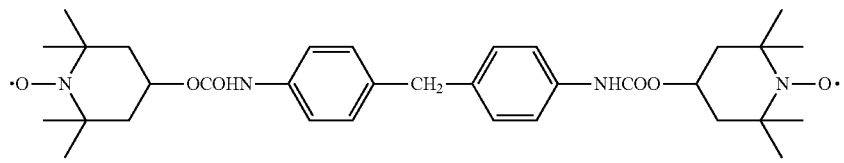

MDP-TEMPO

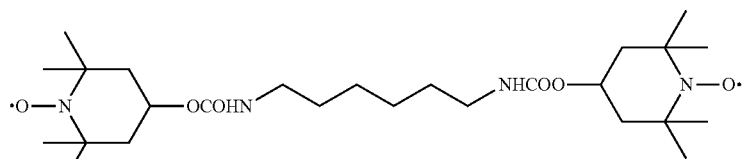

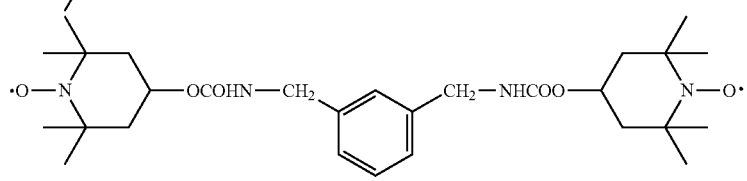

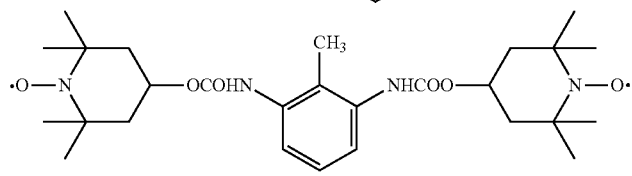

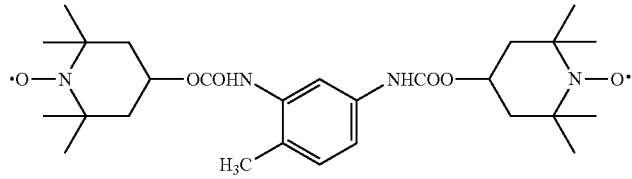

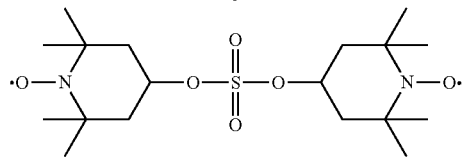

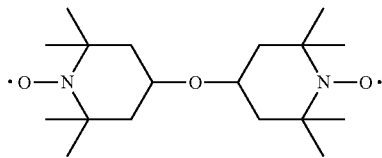

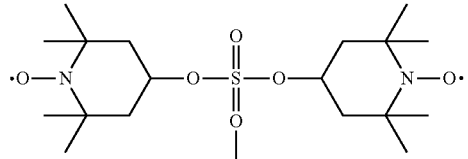

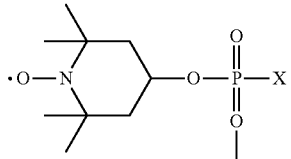

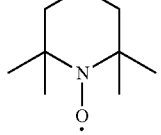

X: Br or Cl

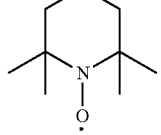

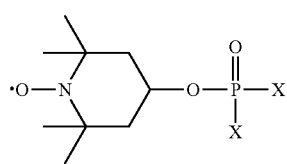

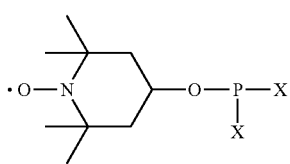

X: Br or Cl

X: Br or Cl

-continued
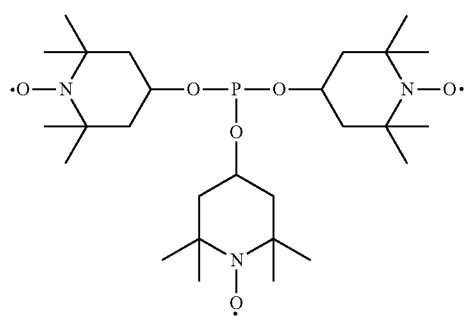
X: Br or Cl
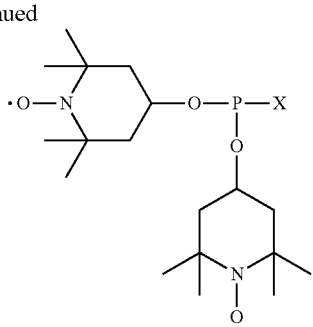
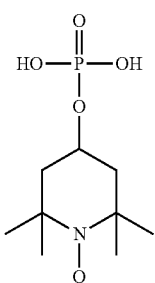
4-phosphonooxy-TEMPO
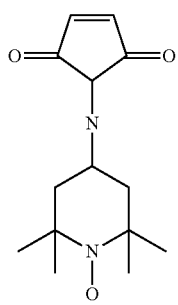
4-maleimide-TEMPO
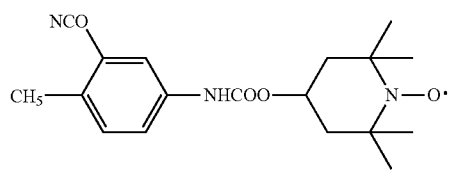
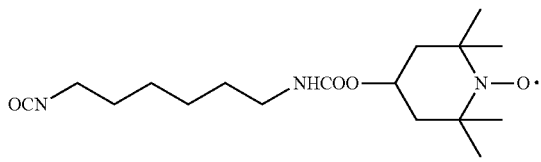
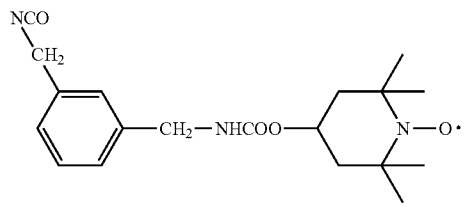
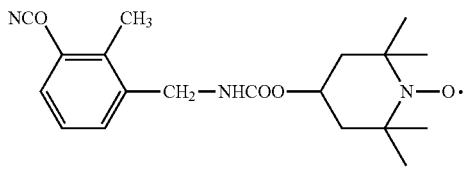
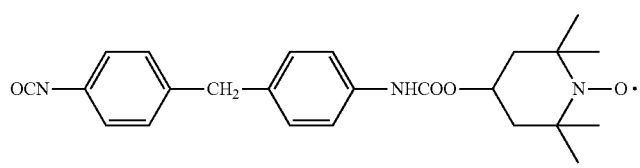
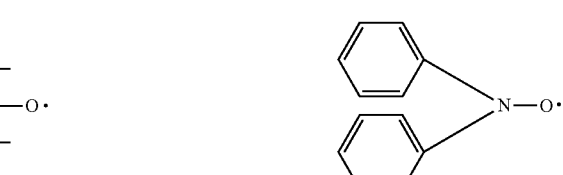
DIPHENYLNITROXY
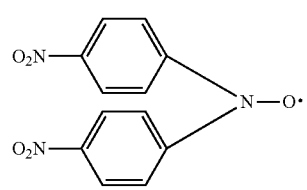
4,4'-DINITRO-DIPHENYLNITROXY
ON(SO₃K)₂
FERMI SALT
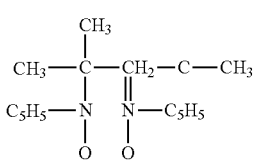
PANFIELD KENYON RADICAL
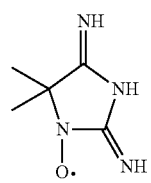
PORPHYREXIDE

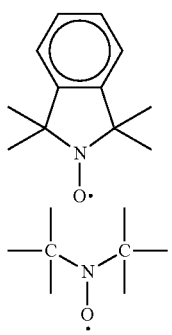

-continued

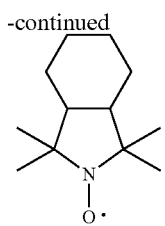

An added amount of the compound (a) used in the present technology is not particularly limited, but is preferably from 0.001 to 0.5 mol, and more preferably from 0.005 to 0.1 mol, per 100 g of the butyl rubber. If the added amount of the compound (a) is too small, there is a possibility that a degree of modification to the butyl rubber will be too small. Conversely, if the added amount is too large, there is a possibility that the peroxide cross-linking will not proceed.

With the present technology, the compound (a) can be introduced to the molecular chain of the butyl rubber by adding the radical initiator (b). Any desired radical initiator can be used as the radical initiator (b), and examples include benzoyl peroxide, t-butyl peroxy benzoate, dicumylperoxide, t-butyl cumyl peroxide, di-t-butylperoxide, 2,5-dimethyl-2, 5-di-t-butyl peroxy hexane, 2,5-dimethyl-2,5-di-t-butylperoxy-3-hexyne, 2,4-dichloro-benzoyl peroxide, di-t-butyl peroxy-di-isopropylbenzene, 1,1-bis(t-butylperoxy)-3,3,5-trimethyl-cyclohexane, n-butyl-4,4-bis(t-butylperoxy) valerate, 2,2-bis(t-butylperoxy)butane, diisobutylperoxide, cumyl peroxy neodecanoate, di-n-propyl peroxy dicarbonate, diisopropyl peroxy dicarbonate, di-sec-butylperoxy dicarbonate, 1,1,3,3-tetramethyl butyl peroxy neodecanoate, di(4-t-butylcyclohexyl)peroxy dicarbonate, 1-cyclohexyl-1-methylethyl peroxy neodecanoate, di(2-ethoxyethyl)peroxy dicarbonate, di(2-ethoxyhexyl)peroxy dicarbonate, t-hexylperoxy neodecanoate, dimethoxybutyl peroxy dicarbonate, t-butyl peroxy neodecanoate, t-hexyl peroxy pivalate, t-butyl peroxy pivalate, di(3,5,5-trimethylhexanoyl)peroxide, di-n-octanoyl peroxide, dilauroyl peroxide, distearoyl peroxide, 1,1,3,3-tetramethyl butylperoxy-2-ethylhexanoate, disuccinate peroxide, 2,5-dimethyl-2,5-di((2-ethylhexanoyl peroxy) hexane, t-hexyl peroxy-2-ethylhexanoate, di(4-methylbenzoyl)peroxide, t-butylperoxy-2-ethylhexanoate; mixtures of di(3-methylbenzoyl)peroxide, benzoyl(3-methylbenzoyl) peroxide, and dibenzoyl peroxide; dibenzoyl peroxide, t-butyl peroxy isobutyrate, and the like.

Additionally, a radical initiator capable of decomposing at low temperature due to an action of a redox catalyst can also be used. Typical examples of such a radical initiator include dibenzoyl peroxide; paramethane hydroperoxide; diisopropylbenzene hydroperoxide; 1,1,3,3-tetramethylbutyl hydroperoxide; cumene hydroperoxide; t-butyl hydroperoxide; and the like.

Other examples of the radical initiator include azo-type radical initiators such as azodicarbonamide; azobisisobutyronitrile; 2,2'-azobis-(2-amidinopropane)dihydrochloride; dimethyl 2,2'-azobis(isobutyrate); azobiscyanovaleric acid; 1,1'-azobis-(2,4-dimethylvaleronitrile); azobismethylbutyronitrile; 2,2'-azobis-(4-methoxy-2,4-dimethylvaleronitrile); and the like.

By adding the radical initiator (b) to a reaction system (blended system or catalyst system), carbon radicals can be generated in the butyl rubber, and the modified butyl rubber can be obtained by reacting the compound (a) having stable free radicals with these carbon radicals.

An added amount of the radical initiator (b) used in the present technology is not particularly limited, but is preferably from 0.001 to 0.5 mol, and more preferably from 0.005 to 0.2 mol, per 100 g of the butyl rubber. If the amount of the radical initiator (b) added is too low, there is a possibility that the number of hydrogen atoms pulled from the butyl rubber chain will be too low. Conversely, if the amount added is too high, there is a possibility that the backbone of the butyl rubber will decompose, greatly reducing the molecular weight thereof.

In the present technology, adding the radical polymeric monomer (c) having at least difunctionality will cause a reaction with the modified butyl rubber, and a cross-linking reaction will occur at peroxide cross-linking. The radical polymeric monomer (c) having at least difunctionality is not particularly limited and examples thereof include ethylene di(meth)acrylate (hereinafter the term "ethylene di(meth) acrylate" refers to both ethylene dimethacrylate and ethylene diacrylate); trimethylolpropane tri(meth)acrylate; ethylene glycol di(meth)acrylate; polyethylene glycol di(meth)acrylate; 1,6-hexanedioldi(meth)acrylate; tetramethylolmethane tri(meth)acrylate; tetramethylolmethane tetra(meth)acrylate; tris(2-hydroxyethyl)isocyanurate tri(meth)acrylate; ethoxylated trimethylolpropane tri(meth)acrylate; pentaerythritol tri (meth)acrylate; ethoxylated trimethylolpropane tri(meth) acrylate; propoxylated trimethylolpropane(meth)acrylate; propoxylated glyceryl(meth)acrylate; pentaerythritol tetra (meth)acrylate; ditrimethylolpropane tetra(meth)acrylate; dipentaerythritol penta(meth)acrylate; ethoxylated pentaerythritol tetra(meth)acrylate; polysiloxane di(meth)acrylate; urethane(meth)acrylates; metal(meth)acrylates; polypropylene glycol di(meth)acrylate; N,N'-phenylene dimaleimide; bismaleimide diphenylmethane; N,N'-phenylene diacrylamide; divinylbenzene; triallyl isocyanurate; and the like. Of these, monomers that have an electron withdrawing group in the molecule such as a carbonyl group (ketones, aldehydes, esters, carboxylates, carboxylate salts, or amides), a nitro group, a cyano group, and the like are preferable from a perspective of increasing the degree of modification.

An added amount of the monomer (c) is not particularly limited, but is preferably from 0.001 to 0.5 mol, and more preferably from 0.005 to 0.2 mol, per 100 g of the butyl rubber. If the added amount of the monomer (c) is too small, there is a possibility that cross-linking of the modified butyl rubber will not proceed. Conversely, if the added amount is too large, physical properties of the cross-linked product are liable to be inferior.

With the present technology, the modified butyl rubber (1) can be prepared by simultaneously reacting a radical polymeric monomer (d) having an alkoxysilyl group (hereinafter also referred to as "monomer (d)") and the radical polymeric monomer (c) having at least difunctionality to produce the modified butyl rubber composition (A). Furthermore, the modified butyl rubber composition (B) can be made by simultaneously adding the monomer (c) and the monomer (d) to the modified butyl rubber (2). By simultaneously reacting or adding the monomer (c) and the monomer (d), a modulus and a breaking strength of the cross-linked rubber molded body can be enhanced. Therefore, durability of the molded body is enhanced.

The radical polymeric monomer (d) having an alkoxysilyl group is preferably as expressed by the following formula (14).

In Formula (14), $R^6$ and $R^7$ independently are hydrocarbon groups; $R^7$ may contain an ether bond; A is a radical polymeric group; and n is an integer from 1 to 3. When n is 2 or 3, each of $R^6$, $R^7$, and A groups may be different groups.

Preferable examples of the hydrocarbon group $R^6$ include alkyl groups such as methyl groups, ethyl groups, propyl groups, hexyl groups, dodecyl groups, octadecyl groups, and the like; cycloalkyl groups such as cyclopropyl groups, cyclohexyl groups, and the like; aryl groups such as phenyl groups, benzyl groups, and the like.

Preferable examples of the hydrocarbon group $R^7$ that can include an ether bond include alkyl groups such as methyl groups, ethyl groups, propyl groups, hexyl groups, dodecyl groups, octadecyl groups, and the like; cycloalkyl groups such as cyclopropyl groups, cyclohexyl groups, and the like; aryl groups such as phenyl groups, benzyl groups, and the like; polyoxyalkylene groups such as polyethylene glycol, polypropylene glycol, and the like.

Preferable examples of the radical polymeric group A include vinyl groups, allyl groups, styryl groups, (meth)acryloxy groups, (meth)acrylamide groups, halogenated vinyl groups, acrylonitrile groups; and the like. Of these groups, those that contain an electron-withdrawing group (such as carbonyl groups, halogen, cyano groups, or the like) are more preferable. Furthermore, (meth)acryloxy groups are especially preferable. Here, "(meth)acryloxy group" refers to an acryloxy group or a methacryloxy group and "(meth)acrylamide group" refers to an acrylamide group or a methacrylamide group.

Preferable examples of the radical polymeric monomer (d) having an alkoxysilyl group include vinyl methoxysilane, vinyl trimethoxysilane, vinyl ethoxysilane, vinyl triethoxysilane, γ-methacryloxypropyl trimethoxysilane, γ-methacryloxypropyl methyldimethoxysilane, γ-methacryloxypropyl dimethylmethoxysilane, γ-acryloxypropylmethyl diethoxysilane, γ-acryloxypropyl dimethylethoxysilane, γ-acryloxypropyl triethoxysilane, N-(propyltriethoxysilane)maleimide, and the like.

Furthermore, the monomer (d) may be used in a hydrolyzed and condensed form. For example, a silicone oil-based coupling agent having two or more repeating siloxane bonds and an alkoxysilyl group that is an oligomer having a radical polymeric group, and the like, may also be used.

An added amount of the monomer (d) used in the present technology is not particularly limited, but is preferably from 0.0001 to 0.5 mol, and more preferably from 0.0003 to 0.2 mol, per 100 g of the butyl rubber. If the added amount of the monomer (d) is too small, the effect of increasing the modulus and the breaking strength of the cross-linked rubber molded body will not be achieved. Conversely, it is not preferable that the added amount of the monomer (d) be too high, because there is a possibility that an excess of the monomer (d) will have a detrimental effect on a compression set of the cross-linked rubber molded body.

With the present technology, the modified butyl rubber can be prepared as shown below. The modified butyl rubber (2) is prepared by heating a pre-blended mixture of the butyl rubber, the compound (a) and the radical initiator (b) at a temperature from 150 to 220° C. in a nitrogen-substituted sealed kneader until reaction occurs. The modified butyl rubber (1) is prepared by temporarily reducing the temperature, then adding the monomer (c) or the monomers (c) and (d) to the modified butyl rubber (2), repeating nitrogen substitution, and then heating at a temperature preferably from 120 to 220° C. until reaction occurs. By performing successive reactions, a degree of grafting of the monomers (c) and (d) to the butyl rubber can be increased. The aforementioned reactions are preferably performed after the nitrogen substitution, but the reactions can also be performed under oxygen-lean conditions.

Furthermore, by adding the monomer (c) or the monomers (c) and (d) to the modified butyl rubber (2), the modified butyl rubber composition (B) containing the unreacted monomer (c) or the monomer (c) and (d) may be prepared.

With the present technology, the adding and reacting of the monomers (c) and (d) can be performed by any commonly known method. Various types of additives, reinforcing fillers, and cross-linking agents may also be simultaneously added. The modification reactions and formulation blendings described above can be performed using a sealed kneader, a twin-screw extrusion kneader, a single-screw extrusion kneader, a roller, a Banbury mixer, kneader, and the like.

With the present technology, the rubber composition is prepared by adding the organic peroxide to the aforementioned modified butyl rubber compositions (A) and (B), and the uncross-linked rubber molded body that forms the surface-modified rubber layer 3 is molded using this rubber composition. Examples of the organic peroxide include benzoyl peroxide; t-butyl peroxy benzoate, dicumylperoxide; t-butyl cumyl peroxide; di-t-butylperoxide; 2,5-dimethyl-2, 5-di-t-butyl peroxy hexane; 2,5-dimethyl-2,5-di-t-butyl peroxy-3-hexene; 2,4-dichloro-benzoyl peroxide; di-t-butylperoxy-di-isopropylbenzene; 1,1-bis(t-butylperoxy)-3,3,5-trimethyl-cyclohexane; n-butyl-4,4-bis(t-butylperoxy) valerate; 2,2-bis(t-butylperoxy)butane; and the like.

An added amount of the organic peroxide is preferably from 0.05 to 15 parts by weight, and more preferably from 0.1 to 10 parts by weight, per 100 weight parts of the rubber composition containing the modified butyl rubber (1) and (2).

With the present technology, the modified butyl rubber compositions (A) and (B) can also contain other rubber components in addition to the modified butyl rubbers (1) and (2). Examples of such other rubber components include natural rubber, isoprene rubber, butadiene rubbers, styrene-butadiene rubbers, butyl rubber, halogenated butyl rubber, chloroprene rubber, acryl rubber, silicone rubber, fluorine rubber, epichlorohydrin rubber, a styrene-isoprene-butadiene copolymer, an ethylene-propylene-diene three-component copolymer, an ethylene-propylene copolymer, an ethylene-propylene-butene three-component copolymer, a styrene-butadiene-styrene block copolymer, a styrene-isoprene-styrene copolymer, a styrene-ethylene-butene-styrene block copolymer, a styrene-ethylene-propylene-styrene copolymer, a acrylonitrile-butadiene copolymer, a hydrogenated acrylonitrile-butadiene copolymer, polyisobutylene, polybutene, a styrene-p-methylstyrene copolymer, a halogenated styrene-p-methylstyrene copolymer, and the like. An added amount of the modified butyl rubbers (1) and (2) is preferably at least 5 weight %, more preferably at least 10 weight %, and even more preferably from 30 to 100 weight %.

The modified butyl rubber compositions (A) and (B) can also contain various additives that are generally added to rubber compositions such as carbon black, reinforcing agents/fillers such as silica, talc, and clay, vulcanizing or cross-linking agents, vulcanizing or cross-linking accelerators, oils, antiaging agents, plasticizers, and the like. These additives may be kneaded in by any commonly known method to form a composition, which can be used for vulcanizing or cross-linking. Compounded amounts of these additives may be any conventional standard amount, so long as the objects of the present technology are not hindered.

With the manufacturing method of the present technology, the siloxane compound having a (meth)acryloyl group is applied to the surface of the uncross-linked rubber molded body that forms the surface-modified rubber layer 3, which is formed using the rubber composition made by compounding the modified butyl rubber composition (A) or (B) with the organic peroxide. Then, the surface-modified rubber layer 3 is laminated on the base rubber layer 1, and heat-treating is performed. The (meth)acryloyl group may be at least one group selected from an acryloyl group and a methacryloyl group. The siloxane compound having a (meth)acryloyl group may be at least one type of organopolysiloxane compound selected from those described in the following formulas (1), (2), and (3).

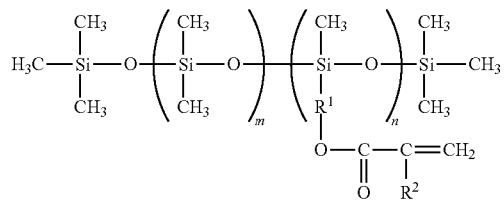

(1)

In Formula (1), $R^1$ is a polyalkylene glycol, or alkyl group, $R^2$ is hydrogen or a methyl group; and m and n are integers such that a number average molecular weight is from 1,000 to 20,000, and a ratio m:n is from 98:2 to 90:10.

The number average molecular weight of the siloxane compound having a (meth)acryloyl group expressed by formula (1) is from 1,000 to 20,000, and preferably from 5,000 to 20,000. m and n are integers selected such that the number average molecular weight falls within the above range, and a ratio of m:n must be from 98:2 to 90:10 and is preferably from 97:3 to 94:6. A number of carbon atoms in $R^1$ is preferably from 4 to 30, and more preferably from 8 to 18. With the present technology, a number average molecular weight of a polysiloxane compound is calculated as standard polystyrene measured by gel permeation chromatography.

An example of such a siloxane compound having a (meth) acryloyl group is organic-modified silicone acrylate TEGO RAD 2700, manufactured by DeGussa.

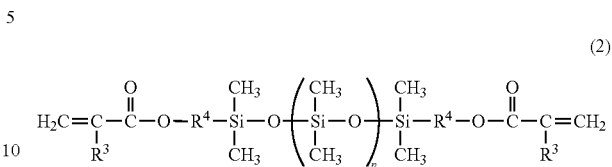

(2)

In formula (2), $R^3$ is hydrogen or a methyl group; $R^4$ is an alkyl group or an alkylene group; and p is an integer such that a number average molecular weight is from 100 to 20,000.

The number average molecular weight of the siloxane compound having a (meth)acryloyl group expressed by the formula (2) is from 100 to 20,000 and preferably from 1,000 to 12,000. p is an integer such that the number average molecular weight falls within the above range. A number of carbon atoms in $R^4$ is preferably from 1 to 30 and more preferably from 3 to 18.

Examples of such a siloxane compound having a (meth) acryloyl group include modified silicone oil X-22-164A (manufactured by Shin-Etsu Chemical Co., Ltd.), double terminated Silaprene (manufactured by Chisso Corp), and the like.

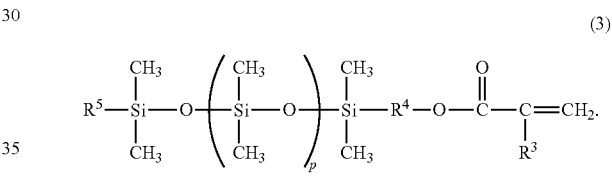

(3)

In formula (3), $R^3$ is hydrogen or a methyl group; $R^4$ and $R^5$ are individually alkyl groups or alkylene groups; and p is an integer such that a number average molecular weight is from 100 to 20,000.

The number average molecular weight of the siloxane compound having a (meth)acryloyl group expressed by formula (3) is from 100 to 20,000 and preferably from 1,000 to 12,000. p is an integer such that the number average molecular weight falls within the above range. Furthermore, a number of carbon atoms in each of $R^4$ and $R^5$ is preferably from 1 to 30, and more preferably from 3 to 18.

Examples of such a siloxane compound having a (meth) acryloyl group include modified silicone oil X-22-2426 (manufactured by Shin-Etsu Chemical Co., Ltd.), single terminated Silaprene (manufactured by Chisso Corp.), and the like.

According to the method for manufacturing a bladder for use in manufacturing tires of the present technology, as the uncross-linked body of the surface-modified rubber layer 3, an uncross-linked rubber molded body made from the rubber composition containing the organic peroxide and the modified butyl rubber composition (A) or (B) is molded, and the siloxane compound having a (meth)acryloyl group is applied to the surface of this rubber molded body. Because the uncross-linked body of the surface-modified rubber layer 3 is laminated on the base rubber layer 1 and then subjected to heat treating, the peroxide cross-linking of the uncross-linked rubber molded body and the reaction of the siloxane compound having a (meth)acryloyl group can occur simultaneously. Therefore, the siloxane compound is thus firmly and chemically bonded to the surface of the surface-modified rubber layer 3, imparting it with excellent releaseability, and greatly enhancing sustainability of that releaseability. Additionally, regardless of the state of vulcanization or non-vulcanization of the base rubber layer 1 on the laminated side, vulcanization adhesion is possible. This bladder for use in manufacturing tires is suitable for use as a bladder that is used in a vulcanization molder for a pneumatic tire. By using such a bladder, excellent releaseability can be obtained without applying release agents such as various types of silicone and the like to an outer surface of the bladder or an inner surface of an unvulcanized tire. Furthermore, this excellent releaseability can be sustained for a long period of time, almost the entire life of the bladder.

The present technology is further explained below by examples. However, the scope of the present technology is not limited to these examples.

EXAMPLES

Manufacturing the Bladder for Use in Manufacturing Tires

Two types of modified butyl rubber compositions (Compositions 1 and 2) with formulations shown in Table 1 were prepared by kneading for 6 minutes in a 150 cc kneader, and then kneading using an 8 inch open roller. Uncross-linked rubber molded bodies for use as surface-modified rubber layers were fabricated by pressing the obtained two types of modified butyl rubber compositions at 90° C. to form 6 inch×6 inch sheets.

Using the obtained uncross-linked bodies for use as surface-modified rubber layers, a siloxane compound having a (meth)acryloyl group (shown as "Siloxane compound" in the tables) was applied to the surfaces of the uncross-linked bodies, as shown in Table 2. The uncross-linked bodies for use as surface-modified rubber layers were laminated on an outer surface side of base bladders that were vulcanization molded using the rubber composition shown in Table 3. Then, the obtained products were inserted into a bladder vulcanizing mold and heat treated for 20 minutes at 180° C. to form four types of bladders for use in tire manufacturing (Working Examples 1 to 4). Outer surfaces of the obtained four types of bladders for use in tire manufacturing were sufficiently washed using methylethyl ketone and xylene to remove the unreacted siloxane compound.

A bladder for use in tire manufacturing of Comparative Example 1 was prepared wherein the rubber composition shown in Table 3 was used and a release agent (aqueous solution having talc as a main component) was applied to the outer surface of the vulcanization molded base bladder. Also, a bladder for use in tire manufacturing of Comparative Example 2 was prepared wherein the rubber composition shown in Table 3 was used and a release agent having siloxane compound as a main component (Rhenodiv, manufactured by Rhein Chemie) was applied to the outer surface of the vulcanization molded base bladder. The bladder for use in tire manufacturing of Comparative Example 2 was heat treated for one hour at 120° C. and cured.

Evaluation of the Bladder for Use in Tire Manufacturing

The obtained six types of bladders for use in tire manufacturing (Working Examples 1 to 4, Comparative Examples 1 and 2) were each used in the continuous vulcanization molding of unvulcanized tires provided with an inner liner on an inner circumferential surface made from the rubber composition shown in Table 4. The number of continuous vulcanization molding cycles until adhesion failure when removing from the mold occurred was counted. Note that the maximum number of continuous vulcanization molding cycles was 500. The results were recorded in Table 2.

TABLE 1

|  |  | Composition 1 | Composition 2 |
|---|---|---|---|
| Modified IIR (1) | Parts by weight | 100 |  |
| Modified IIR (2) | Parts by weight |  | 100 |
| Carbon black | Parts by weight | 50 | 50 |
| Stearic acid | Parts by weight | 1 | 1 |
| Oil | Parts by weight | 5 | 5 |
| Zinc oxide | Parts by weight | 5 | 5 |
| Organic peroxide | Parts by weight | 3 | 3 |
| Monomer (c) | Parts by weight |  | 5 |

Raw materials used in Table 1 are shown below.

Modified IIR (1): Modified butyl rubber (1), manufactured by the method shown below.

Modified IIR (2): Modified butyl rubber (2), manufactured by the method shown below.

Carbon Black: HAF grade carbon black (manufactured by Tokai Carbon Co., Ltd.)

Stearic acid: Beads Stearic Acid YR (manufactured by NOF Corp.)

Oil: Castor bean oil, Castor Oil (manufactured by Ito Oil Chemicals Co., Ltd.)

Zinc oxide: Zinc Oxide #3 (manufactured by Seido Chemical Industry Co., Ltd.)

Organic peroxide: Dicumyl peroxide, Percumyl D-40 (manufactured by NOF Corp.)

Monomer (c): Ditrimethylol propane tetraacrylate, SR-355 (manufactured by Sartomer)

Preparation of Modified Butyl Rubber (1)

350.0 g of butyl rubber (BUTYL 301 manufactured by Lanxess Co., Ltd.), 32.2 g of OH-TEMPO (4-hydroxy-2,2,6,6-tetramethylpiperidinyl-1-oxyl, LA7RD manufactured by ADEKA Corp., compound (a)), and 24.2 g of 1,3-bis-(t-butyl peroxyisopropyl)benzene (Percadox 14-G manufactured by Kayaku Akzo Co., Ltd., radical initiator (b)) were weighed into a sealed Banbury mixer set to a temperature of 60° C. and blended for 10 minutes. The mixture obtained was kneaded in a sealed Banbury mixer set to a temperature of 100° C. while performing nitrogen substitution for 5 minutes. While kneading, the temperature was increased to 165° C. and kneading was continued for 20 minutes. A portion of the polymer obtained was dissolved in toluene, and the polymer was isolation purified by reprecipitation action. A TEMPO position of introduction (of the alkoxyamino group) was confirmed by analyzing with $^1$H-NMR using the purified product. A degree of introduction thereof was 0.360 mol %.

The reaction system was temporarily brought to 150° C., and then 11.2 g of ditrimethylol propane tetraacrylate (SR-355 manufactured by Sartomer, monomer (c)) and 5.8 g of methacrylsilane (γ-methacryloxypropyl trimethoxysilane, KBM503 manufactured by Shin-Etsu Chemical Co., Ltd., monomer (d)) were weighed and added. Then, nitrogen substitution was performed for 5 minutes while kneading. While kneading, the temperature was increased to 185° C. and kneading was continued for 15 minutes to obtain the modified butyl rubber (1).

A portion of the modified butyl rubber (1) obtained was dissolved in toluene, and the polymer was isolation purified by reprecipitation action. IR analysis and $^1$H-NMR analysis were performed using the purified product. Ester carbonyl absorption was observed around 1,720 cm$^{-1}$, and a ditrimethylol propane signal was observed near 6.39, 6.10, 5.96, 4.12, and 3.30 ppm according to the $^1$H-NMR. It was confirmed that the ditrimethylol propane tetraacrylate was introduced with a structure that left three olefins remaining. A degree of introduction thereof was 0.084 mol %. Furthermore, a methacrylsilane signal was observed near 3.55 ppm, and a degree of introduction thereof was 0.015 mol %.

Preparation of the Modified Butyl Rubber (2)

350.0 g of butyl rubber (BUTYL 301 manufactured by Lanxess Co., Ltd.), 32.2 g of OH-TEMPO (4-hydroxy-2,2,6,6-tetramethylpiperidinyl-1-oxyl, LA7RD manufactured by ADEKA Corp., compound (a)), and 30.4 g of di-t-butyl peroxide (Perbutyl D manufactured by NOF Corp., radical initiator (b)) were weighed into a sealed Banbury mixer set to a temperature of 60° C. and blended for 10 minutes. The mixture obtained was kneaded in a sealed Banbury mixer set to a temperature of 100° C. while performing nitrogen substitution for 5 minutes. While kneading, the temperature was increased to 186° C. and kneading was continued for 20 minutes to obtain the modified butyl rubber (2).

A portion of the modified butyl rubber (2) obtained was dissolved in toluene, and the polymer was isolation purified by reprecipitation action. A TEMPO position of introduction (of the alkoxyamino group) was confirmed by analyzing with $^1$H-NMR using the purified product. A degree of introduction thereof was 0.348 mol %.

The types of raw materials used in Table 3 are shown below.

IIR: Butyl rubber, BUTYL 301 (manufactured by Lanxess Co., Ltd.)

CR: Chloroprene rubber, Neoprene W (manufactured by DuPont)

Carbon Black (1): HAF grade carbon black (manufactured by Tokai Carbon Co., Ltd.)

Oil (1): Castor bean oil, Castor Oil (manufactured by Ito Oil Chemicals Co., Ltd.)

Zinc oxide: Zinc Oxide #3 (manufactured by Seido Chemical Industry Co., Ltd.)

Alkyl phenol-formaldehyde resin: Hitanol 2501Y (manufactured by Hitachi Chemical Co., Ltd.)

TABLE 4

| Brominated IIR | Parts by weight | 100 |
| Carbon black (2) | Parts by weight | 60 |
| Stearic acid | Parts by weight | 2 |
| Oil (2) | Parts by weight | 8 |
| Zinc oxide | Parts by weight | 3 |
| Magnesium oxide | Parts by weight | 0.5 |
| Petroleum resin | Parts by weight | 3 |
| Sulfur | Parts by weight | 0.5 |
| Vulcanization accelerator | Parts by weight | 1.5 |

TABLE 2

|  | W.E. 1 | W.E. 2 | W.E. 3 | W.E. 4 | C.E. 1 | C.E. 2 |
| --- | --- | --- | --- | --- | --- | --- |
| Presence/absence of surface-modified rubber layer | Present | Present | Present | Present | Absent | Absent |
| Type of rubber composition that forms the uncross-linked body of the surface-modified rubber layer | Composition 1 | Composition 1 | Composition 2 | Composition 2 | Release agent applied once to the outer surface of the base bladder | Siloxane compound applied to the outer surface of the base bladder, heated, and cured |
| Type of siloxane compound | Siloxane compound A | Siloxane compound B | Siloxane compound A | Siloxane compound B | | |
| Number of cycles of continuous vulcanization molding | 500 | 500 | 500 | 500 | 1 | 20 |

The types of raw materials used in Table 2 are shown below.

Compositions 1 and 2: Rubber compositions as shown in Table 1

Siloxane compound A: Siloxane compound having a (meth)acryloyl group expressed by formula (2); Number average molecular weight=1,720; Modified silicone oil X-22-164A (manufactured by Shin-Etsu Chemical Co., Ltd.)

Siloxane compound B: Siloxane compound having a (meth)acryloyl group represented by formula (1); Number average molecular weight=20,000; Organic modified silicone acrylate TEGO RAD 2700 (manufactured by Degussa)

TABLE 3

| IIR | Parts by weight | 100 |
| CR | Parts by weight | 5 |
| Carbon black (1) | Parts by weight | 50 |
| Oil (1) | Parts by weight | 5 |
| Zinc oxide | Parts by weight | 5 |
| Alkyl phenol-formaldehyde resin | Parts by weight | 10 |

The types of raw materials used in Table 4 are shown below.

Brominated IIR: Brominated Butyl rubber, BUTYL 301 (manufactured by Lanxess Co., Ltd.)

Carbon Black (2): GPF grade carbon black (manufactured by Tokai Carbon Co., Ltd.)

Stearic acid: Beads Stearic Acid YR (manufactured by NOF Corp.)

Oil (2): Aromatic oil FR-120 (manufactured by Air Water Inc.)

Zinc oxide: Zinc Oxide #3 (manufactured by Seido Chemical Industry Co., Ltd.)

Magnesium oxide: Kyomag 150 (manufactured by Kyowa Chemical Corp.)

Petroleum resin: Hilets G100X (manufactured by Mitsui Chemicals, Inc.)

Sulfur: Powdered sulfur (manufactured by Karuizawa Seisakusho Co., Ltd.)

Vulcanization accelerator: MBTS, Nocceler DM (manufactured by Ouchi Shinko Chemical Industrial Co., Ltd.)

The rubber composition for an inner liner in Table 4 was made by measuring the formulation components other than sulfur and the vulcanization accelerator, kneading in a sealed Banbury mixer, discharging a master batch at a temperature of 160° C., and cooling to room temperature. Sulfur and the vulcanization accelerator were then mixed into the master batch in a sealed Banbury mixer to produce the rubber composition.

What is claimed is:

1. A method for manufacturing a bladder for use in manufacturing tires that comprises a surface-modified rubber layer on an outer surface side of a base rubber layer, comprising the steps of:

forming an uncross-linked body of the surface-modified rubber layer by molding a rubber composition including a modified butyl rubber composition (A) or (B) and an organic peroxide and applying a siloxane compound having a (meth)acryloyl group to a surface of this rubber molded body;

wherein the modified butyl rubber composition (A) comprises a modified butyl rubber (1) formed by reacting with butyl rubber a compound (a) having a nitroxide free radical in a molecule that is stable at ambient temperature in the presence of oxygen, a radical initiator (b), and a radical polymeric monomer (c) having at least difunctionality; and the modified butyl rubber composition (B) is formed by compounding the monomer (c) with a modified butyl rubber (2) formed by reacting the compound (a) and the radical initiator (b) with butyl rubber;

forming the base rubber layer from an unvulcanized body or vulcanized body formed from a rubber composition different than the modified butyl rubber compositions (A) and (B);

laminating the uncross-linked body of the surface-modified rubber layer on the outer surface side of the base rubber layer; and heat treating.

2. The method for manufacturing a bladder for use in manufacturing tires according to claim 1, wherein the siloxane compound having a (meth)acryloyl group is at least one selected from organopolysiloxane compounds expressed by the following formulas (1), (2), or (3):

Formula I

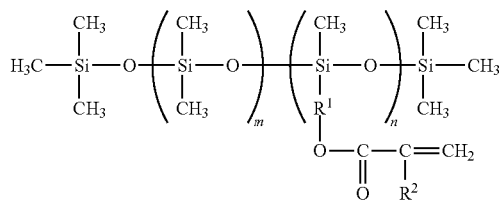

(wherein $R^1$ is a polyalkylene glycol or alkyl group, $R^2$ is hydrogen or a methyl group; and m and n are integers selected such that a number average molecular weight is from 1,000 to 20,000, and a ratio m:n satisfies 98:2 to 90:10);

Formula 2

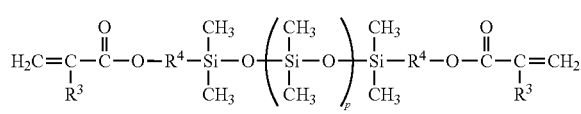

(wherein $R^3$ is a hydrogen or a methyl group; $R^4$ is an alkyl group or an alkylene group; and p is an integer selected such that a number average molecular weight is from 100 to 20,000);

Formula 3

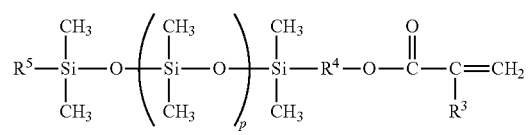

(wherein $R^3$ is hydrogen or a methyl group, $R^4$ and $R^5$ independently are alkyl groups or alkylene groups, and p is an integer selected such that a number average molecular weight is from 100 to 20,000).

3. The method for manufacturing a bladder for use in manufacturing tires according to claim 2, wherein a number of carbon atoms in $R^1$ is from 4 to 30; and a number of carbon atoms in each of $R^4$ and $R^5$ is from 1 to 30.

4. The method for manufacturing a bladder for use in manufacturing tires according to claim 1, wherein the radical polymeric monomer (c) having at least difunctionality and a radical polymeric monomer (d) having an alkoxysilyl group are simultaneously reacted or compounded.

5. The method for manufacturing a bladder for use in manufacturing tires according to claim 1, wherein the base rubber layer comprises a base bladder that is formed by vulcanization molding a butyl rubber composition.

6. The method for manufacturing a bladder for use in manufacturing tires according to claim 5, wherein after laminating the uncross-linked body of the surface-modified rubber layer on the outer surface side of the base bladder, this laminate is heat treated in a mold.

7. The method for manufacturing a bladder for use in manufacturing tires according to claim 1, wherein the base rubber layer comprises a butyl rubber composition having at least one of butyl rubber and halogenated butyl rubber as a main component.

8. The method for manufacturing a bladder for use in manufacturing tires according to claim 1, wherein the base rubber layer comprises from 30 to 80 parts by weight of carbon black compounded per 100 parts by weight of a rubber component of the base rubber layer.

9. The method for manufacturing a bladder for use in manufacturing tires according to claim 1, wherein the base rubber layer comprises from 40 to 70 parts by weight of carbon black compounded per 100 parts by weight of a rubber component of the base rubber layer.

10. The method for manufacturing a bladder for use in manufacturing tires according to claim 1, wherein an added amount of the compound (a) is from 0.001 to 0.5 mol, per 100 g of the butyl rubber.

11. The method for manufacturing a bladder for use in manufacturing tires according to claim 1, wherein an added amount of the compound (a) is from 0.005 to 0.1 mol, per 100 g of the butyl rubber.

12. The method for manufacturing a bladder for use in manufacturing tires according to claim 1, wherein an added amount of the radical initiator (b) is from 0.001 to 0.5 mol, per 100 g of the butyl rubber.

13. The method for manufacturing a bladder for use in manufacturing tires according to claim 1, wherein an added amount of the radical initiator (b) is from 0.005 to 0.2 mol, per 100 g of the butyl rubber.

14. The method for manufacturing a bladder for use in manufacturing tires according to claim 4, wherein the monomer (d) is in a hydrolyzed and condensed form.

15. The method for manufacturing a bladder for use in manufacturing tires according to claim 14, wherein the monomer (d) is expressed by the following formula:

$$Si(OR^7)_{4-n}(R^6\text{-A})_n$$

where $R^6$ and $R^7$ independently are hydrocarbon groups; $R^7$ contains an ether bond; A is a radical polymeric group; n is an integer from 1 to 3; and when n is 2 or 3, each of $R^6$, $R^7$, and A groups are different groups.

16. The method for manufacturing a bladder for use in manufacturing tires according to claim 14, wherein an added amount of the monomer (d) is from 0.0001 to 0.5 mol, per 100 g of the butyl rubber.

17. The method for manufacturing a bladder for use in manufacturing tires according to claim 14, further comprising preparing the modified butyl rubber composition (A) or (B) by:
heating a pre-blended mixture of the butyl rubber, the compound (a) and the radical initiator (b) at a temperature from 150 to 220° C. in a nitrogen-substituted sealed kneader until reaction occurs for the modified butyl rubber composition (B); or
temporarily reducing the temperature, adding the monomer (c) or the monomers (c) and (d) to the modified butyl rubber (2), repeating nitrogen substitution, and heating at a temperature from 120 to 220° C. until reaction occurs for the modified butyl rubber composition (A).

18. The method for manufacturing a bladder for use in manufacturing tires according to claim 1, wherein an added amount of the organic peroxide is from 0.05 to 15 parts by weight per 100 weight parts of the rubber composition containing the modified butyl rubber (1) and (2).

19. The method for manufacturing a bladder for use in manufacturing tires according to claim 1, wherein an added amount of the modified butyl rubbers (1) and (2) is at least 5 weight %.

20. A bladder for use in manufacturing tires manufactured according to the manufacturing method of claim 1.

* * * * *